United States Patent [19]
Qureshi

[11] Patent Number: 5,758,154
[45] Date of Patent: May 26, 1998

[54] METHOD AND SYSTEM FOR STORING CONFIGURATION DATA INTO A COMMON REGISTRY

[75] Inventor: Imran I. Qureshi, Mountain View, Calif.

[73] Assignee: Microsoft Corporation, Redmond, Wash.

[21] Appl. No.: 658,270

[22] Filed: Jun. 5, 1996

[51] Int. Cl.$^6$ .................................................. G06F 9/06
[52] U.S. Cl. ............................................ 395/651; 395/682
[58] Field of Search ................................ 395/651, 652, 395/653, 712, 680, 682

[56] References Cited

U.S. PATENT DOCUMENTS

| | | | |
|---|---|---|---|
| 5,414,846 | 5/1995 | Lemble et al. | 395/651 |
| 5,430,878 | 7/1995 | Straub et al. | 395/651 |
| 5,504,904 | 4/1996 | Dayan et al. | 395/651 |
| 5,675,748 | 10/1997 | Ross | 395/651 |
| 5,675,793 | 10/1997 | Crick et al. | 395/651 |
| 5,675,794 | 10/1997 | Meredith | 395/651 |
| 5,682,528 | 10/1997 | Baker et al. | 395/651 |

OTHER PUBLICATIONS

Microsoft© Windows™, Version 3.1, *Programmer's Reference vol. 1: Overview*, Microsoft Corporation, Redmond, Washington, 1987–1992, pp. 257–269.

*Primary Examiner*—Kevin A. Kriess
*Attorney, Agent, or Firm*—Seed and Berry LLP

[57] ABSTRACT

A shared registration DLL and configuration data files that are used by setup programs and their corresponding application programs to register configuration information in a registry and to un-register configuration information from a registry. The shared registration DLL simplifies writing and synchronizing configuration information registration routines in a setup program and in its corresponding application program. The shared registration DLL allows for specifying relative file system pathnames to the application and to application files, rather than requiring file system pathnames to be fully specified. The shared registration DLL allows for configuration information registered previously by an older version of an application to be stored in the registry when a newer version of the application is installed, and to be restored when the newer version is removed from the computer system. The shared registration DLL and configuration data files allow for incremental addition of configuration information to the registry when new components for a previously installed application are added to the computer system.

40 Claims, 7 Drawing Sheets

METHOD AND SYSTEM FOR STORING CONFIGURATION DATA INTO A COMMON REGISTRY

TECHNICAL FIELD

The present invention relates to the field of computer system support for application program execution, and more particularly, to a method and system for registering in a registry various configuration information used at run-time by application programs.

BACKGROUND OF THE INVENTION

The Windows operating system by Microsoft Corporation provides a system-wide registry for storing configuration information. Application programs, application setup programs, and the operating system itself each store their own configuration information in the registry. Because the registry has a pre-defined format and is system-wide, any application program can access the information in the registry. Prior versions of the Windows operating system did not have such a registry. Rather, the configuration information for each application program was stored in an ".INI" file for that application program.

The configuration information in the registry is organized into hierarchical keys and associated key entries. There are currently six predefined root keys in the registry: "HKEY_CLASSES_ROOT," "HKEY_CURRENT_USER," "HKEY_LOCAL_MACHINE," "HKEY_USERS," "HKEY_CURRENT_CONFIG," "HKEY_DYN_DATA." These six root keys define six main categories under which sub-keys can be defined. Sub-keys can themselves contain further levels of sub-keys. For example, the registry might contain the following three keys, each of the three keys comprising the root key "HKEY_DYN_DATA" and one sub-key:

"HKEY_DYN_DATA\ConfigManager"

"HKEY_DYN_DATA\PerfStats"

"HKEY_DYN_DATA\Security"

Each key and sub-key level are separated by the "\" character, much like a file system pathname specification in the Windows operating system. The registry may contain an arbitrary number of hierarchical levels of sub-keys. An example of a key having 4 levels is the key:

"HKEY_DYN_DATA/ConfigManager/Enum/C1121A6C"

Each key in the registry can have one or more key entries. In addition to having a specific assigned value, each key entry may have a name, specified as a character string, and a value type selected from a number of possible predefined types, including: "REG_SZ"—a character string, "REG_DWORD"—a 32-bit integer specified in decimal notation, and "REG_HEX"—a 32-bit integer specified in hexadecimal notation. If no value type is specified for a key entry, the key entry has the default value type "RG_SZ." Each key may have with one default key entry that has no name.

The Windows operating system provides a program ("Regedit") through which a user can display and edit the information stored in the registry. This program also exports the information from the registry and stores it in a text file. The user can then view the information in the file using a standard text editor. Each exported key is stored in a separate line in the text file that is followed with a line for each key entry for that key. The following key and associated key entries were a part of a text file exported from the registry:

1 [HKEY_LOCAL_MACHINE\SOFTWARE\Classes\Drive]

2 @="Drive"

3 "EditFlags"=hex:d2,01,00,00

In the text file, keys are indicated by a text string enclosed in brackets. "HKEY_LOCAL_MACHINE\SOFTWARE\Classes\Drive" is the key specified above. The key entries are specified on a line that contains the key name, an "=", and then the key entry value. Key entry names are specified by quoted character strings. The default key entry name is specified by the "@" character. A key entry value is specified either by a quoted character string or by a value type separated from a specified value by a colon. For example, the second line above indicates that the default key entry associated with the key "HKEY_LOCAL_MACHINE\SOFTWARE\Classes\Drive" has the character string value "Drive." The third line indicates that the key entry named "EditFlags" has an integer value specified as the hexadecimal number d2,01,00,00 (4,043,374,592 in decimal notation).

An application program retrieves configuration information from the registry during execution to control its execution. The application uses specific keys and key entry names to reference the associated key entry values. For example, the application program may use a key entry value to retrieve the file system pathname corresponding to a file containing a bit-mapped image that the application program displays in its initial window. The application may also use a key entry value to retrieve parameter settings selected by the user during installation of the application. An application program can also add new keys and associated key entries to the registry, or change the values of existing key entries. An application program accesses the registry by calling one of the several registry function system calls defined in the registry application programming interface. Those functions include: RegEnumKeyEx, which enumerates the sub-keys of a specified key; RegOpenKeyEx, which opens and returns a handle to a specified key; RegEnumValue, which enumerates the key entries associated with a specified key; RegQueryValueEx, which returns the assigned value of a specified key entry; RegSetValueEx, which assigns a value to a specified key entry, creating the key entry if the key entry was not previously registered; RegDeleteKey, which removes a key from the registry; and RegDeleteValue, which removes a key entry from the registry.

Although the registry represents a significant improvement over the prior method of storing and retrieving configuration information in separate application-specific ".INI" files, certain problems in using and managing the registry have been recognized. An application is generally installed into a computer system by a separate setup program. The setup program collects configuration information from the user and from the computer system and stores the collected information into the registry. When the application is launched following setup, it retrieves the stored configuration information from the registry. The application program itself can subsequently store new configuration information or change already stored configuration information in the registry. A serious problem arises if the application program does not store configuration information in exactly the same fashion as the setup program, or expects different or differently specified information than that stored by the setup routine. Although this problem can be alleviated by careful coordination of the development of the application program and its setup program, such coordination has been difficult to achieve. In particular, in the rush to meet development deadlines, the application program may be changed to expect certain information in the registry, but the developer forgets to make analogous changes to the setup program.

Another problem arises when a new version of an application program is installed over an existing version. The new configuration information replaces the configuration stored for the earlier version of the program. If the new version of the application program is then removed, configuration information required by the older version may no longer be available from the registry, or may be different than that originally stored by the older version.

When configuration information is missing or corrupted, the older application program can fail to run properly, and can possibly further corrupt the computer system. Yet another problem occurs when file system pathnames assigned as values of key entries become stale or invalid when the application or the application's data files for which the pathnames were stored is moved to a different file system location. If, for example, the data files required by an application are moved to the directory "C:\newdirectory," and the value retrieved from the registry that indicates the location of the data files is "C:\olddirectory," the application will not find the necessary data files. Finally, if new components for an existing application are later distributed, it may be necessary to re-execute the entire installation procedure to update the registry information and configuration data files. There is no simple way to incrementally update the registry and data files.

SUMMARY OF THE INVENTION

The present invention provides a registration system for registering configuration information for an application program. A registry is provided that stores configuration information. The application program has a setup program for storing configuration information in the registry during installation of the application program on a computer system. The setup program invokes a registration routine, passing to the registration routine a configuration file that contains a description of the configuration information to be loaded into the registry for the application program. The application program also invokes the registration routine, passing to the registration routine the same configuration file. The invoked registration routine opens the indicated configuration file and retrieves the description of the configuration information to be loaded. The registration routine then stores the configuration information in the registry based on the retrieved description of the configuration information. In this way, the setup program and the application program store the configuration information in the registry in a consistent manner.

DETAILED DESCRIPTION OF THE INVENTION

Figure 1:
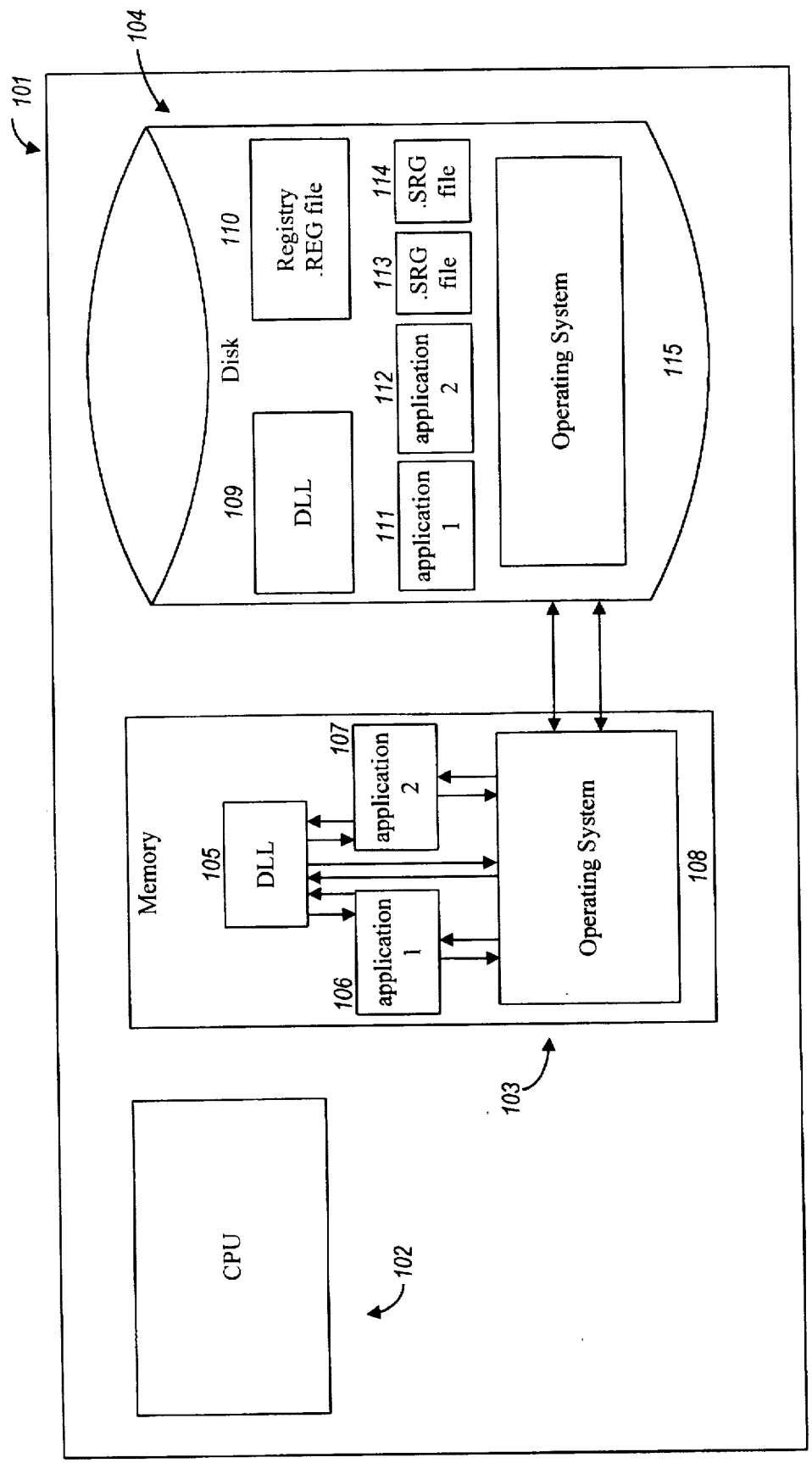
FIG. 1 is a block diagram illustrating a preferred computer system that includes the present invention.

A preferred embodiment of the present invention provides a registration routine that is invoked by computer programs to store configuration information for the computer programs in a registry. When a computer program invokes the registration routine, it passes to the registration routine a configuration file that contains a description of the configuration information for the computer program. The registration routine opens the configuration file and adds the configuration information to the registry. The use of such a registration routine provides a solution to the problem of an application program and its setup program storing configuration information in the registry in an inconsistent manner. In particular, both the application program and its setup program invoke the registration routine, passing to the registration routine the same configuration file. In this way, the registration routine can ensure the consistency of the configuration information.

In another aspect of the present invention, the registration routine registers configuration information in a way that allows an old version of an application program to execute correctly after a new version has been uninstalled. In particular, when a new version of an application program is installed, the registration routine stores the configuration information for the new version in the registry. Prior to storing the new configuration information, the registration routine saves the configuration information for the old version. When the new version is subsequently un-installed, an un-registration routine is invoked to un-register its configuration information. When the un-registration routine un-registers, it also restores the configuration information for the old version. In this way, the old version, when executed, will access its correct configuration information.

A preferred embodiment of the invention provides a registration DLL that provides two entry points both to setup programs and to their corresponding application programs for registering configuration information into the registry and un-registering configuration information from the registry. The program calling the registration DLL to register or un-register configuration information provides a data file having a specific format that contains the configuration information to be registered or un-registered. The data file is preferably named with a filename having a ".SRG" extension, and is known as a self-registration file ("SRG file"). The executable routines included in the registration DLL parse the data file and carry out the appropriate operations on the registry. The configuration information may also be provided in a pair of files, one named with a filename having a SKL extension, known as a skeleton file ("SKL file"), and one named with a filename having a TOK extension, known as a placeholder file ("TOK file").

The registration DLL provides a DllRegisterServer and DllUnregisterServer routine, which register and un-register configuration information. A setup program and its corresponding application program can use a common SRG file to register and un-register configuration information. They no longer need to implement complex, parallel systems for soliciting and registering configuration information, but can use the DllRegisterServer and DllUnregisterServer routines and a common SRG file.

Moreover, when a new component is added to an already installed application, the user previously was required to re-execute the entire installation procedure. With the registration DllRegisterServer routine, a new SRG file that includes only the configuration information required by the new component can be distributed along with the new component, and the registry can be properly updated by simply calling DllRegisterServer and supplying as an argument the pathname of the SRG file containing the configuration information required by the new component.

Previously, installation of a more recent version of an application program overwrote configuration information registered by an earlier version already installed on the computer system. If, for some reason, the newer version of the application was subsequently un-installed, the registry information for the earlier version was most likely left in a corrupted state by the installation of the more recent version. The DllRegisterServer and DllUnregisterServer routines solve this problem by saving the earlier version's configuration information under key entries with an "Old" prefix when a more recent version is installed, and by restoring the earlier version's configuration information when the more recent version is un-installed. Furthermore, DllUnregisterServer recursively removes any parent keys that were added by the more recent version.

Previously, full file system pathnames were registered by setup programs and application programs. If the application was subsequently moved to a new location in the file system, it would no longer run, because the registered pathnames were no longer correct. The registration DLL automatically detects the current file system location of a calling application, and the SRG configuration data file may include relative file system pathnames that include placeholders. Each time an application program is executed, it can call DllRegisterServer, supplying as an argument the SRG file, and DllRegisterServer will update key entries that contain relative file system pathnames by substituting the current file system location of the application for the placeholders in the relative pathnames.

Because the registry is supported by both the Windows '95 and Windows NT operating systems, the same registration and un-registration methodology can be used by applications and setup programs on both operating systems, again simplifying the writing and coordination of configuration information collection and registration. Finally, by employing SKL and TOK files, rather than a single SRG file, the configuration information can be maintained and managed separately from the pathname information for a particular application.

FIG. 1 is a block diagram illustrating a preferred computer system that includes the present invention. The computer system 101 contains a central processing unit 102, a memory 103, and a disk storage device 104. The memory contains executable code or portions of the executable code for the registration DLL 105, application programs 106 and 107, and the computer operating system 108. The disk storage device contains executable files that comprise permanent copies of the code for the registration DLL 109, the application programs 111 and 112, and the operating system 115. The disk storage device contains, in addition, SRG files 113 and 114 used by the application programs to register configuration information in the registry and the registry file 104, where the configuration information is stored. The operating system loads executable code for the applications and the registration DLL into memory from the executable files stored on the disk storage device. The application programs invoke operating system routines in order to access the various services provided by the operating system, including routines for reading and writing files. The application programs invoke the registration and un-registration routines provided by the registration DLL to register and un-register configuration information, passing an indication SRG file that contains the configuration information to register or un-register. The registration and un-registration routines of the registration DLL call operating system routines to write information to the registry file and read information from the registry file.

SRG File

A short example of a SRG file is provided below to illustrate the format of the file expected by the registration and un-registration routines:

```
1  [HKEY_CLASSES_ROOT\.ppt]
2  Add If Newer:
3  @="PowerPoint.Show.7"
4
5  [HKEY_CLASSES_ROOT\PowerPoint.Show.7]
6  @="Microsoft PowerPoint Presentation"
7
8  [HKEY_CLASSES_ROOT\PowerPoint.Show.7\protocol\
   StdFileEditing\server]
9  Use Short Path:
10 @="<PowerPoint Path>\\powerpnt.exe"
11
12 [HKEY_CLASSES_ROOT\PowerPoint.Show.7\shell\open\
   command]
13 @="<PowerPoint Path>\\powerpnt.exe\"%1\" "
14
15 [HKEY_CURRENT_USER\Software\Microsoft\Office\PowerPoint\
   7.0\
16 DLLAddins\PPTTOOLS]
17 "InitFunction"="_MenuInit@4"
18 "AutoLoad"="dword:0x1"
19 "Path"="<PowerPoint Path>\\ppttools.dll"
```

The format of the SRG file is quite similar to the format of the text file that is exported from the registry, discussed above in the background. Keys are represented as character strings enclosed within square brackets. For example, in line 1 of the above example, "[HEKY_CLASSES_ROOT\.ppt]" specifies the key "HKEY_CLASSES_ROOT\.ppt" comprises the root key "HKEY_CLASSES_ROOT" and the sub-key ".ppt"

Following a key specification in the SRG file, there may be one or more key entry assignments. For example, in line 3, the default key entry, as designated by the "@" character, is assigned the character string value "PowerPoint.Show.7." The syntax for the assignments is similar to that in the text file that is exported from the registry, discussed above in the background, with the exception that non-character-string key entry values are enclosed in quotes. In the text file exported from the registry, such key entry values are not enclosed in quotes. The key entry to be assigned is identified by a quoted character string or by the default key entry designator "@." Following the identification of the key entry is the assignment operator "=" which is, in turn, followed by a specific value to assign to the key entry. The specific value is a quoted string comprising a value type specifier separated by a colon from the specific value. For example, in line 17, the key entry "AutoLoad" associated with the key "HKEY_CURRENT_USER\Software\microsoft\Office\PowerPoint\7.0\DLLAddins\PPTTOOLS" is assigned the integer value 1. If there is no value type specifier and colon in the quoted string representing the specific value to assign to the key entry, then the quoted string itself represents the specific value. In line 6, the default key entry for the key "HKEY_CLASSES_ROOT\PowerPoint Presentation" is assigned to have the character string value "Microsoft PowerPoint Presentation."

There are three features of the SRG file that are not found in the text file exported from the registry. An "Add If Newer:" tag, as shown in line 2, can be inserted before a key-value to indicate that the specified value should be registered only when a more recent version of the application is being registered. If a more recent version of an application is being registered, then the registration DLL automatically saves the previous key entries for each key entry that is being registered. In particular, the value of the key entry already registered is assigned to a key entry with the prefix "Old" added to the name of the key entry to be registered. For example, if the most recent version of PowerPoint registered is version 4, then during installation of version 7, the registration DLL will process line 3 of the above example by registering a key entry with the key name "OLD" and with a value equal to the old default key entry for the "HKEY_CLASSES_ROOT\.ppt". The registration DLL will then change the value of the default key entry to "PowerPoint.7." If the default key entry for the key "HKEY_CLASSES_ROOT\.ppt" was not registered by the version 4 PowerPoint application, then the registration DLL will simply register the key entry as specified in line 3.

A "Use Short Path" tag can be specified in the SRG file, as illustrated in line 9. When the registration DLL detects this tag, the registration DLL transforms the file system pathname that specifies the current location of the application to a 8.3 pathname, the former Microsoft standard having filenames of 8 characters or less followed by an extension having 3 characters or less. The transformed file system pathname is then used to construct file system pathnames that are assigned as values of key entries. This feature is useful when the file system that manages the file uses the 8.3 standard.

The final feature of SRG files that is different from the text file exported from the registry is the occurrence of placeholders within character string values that specify file system pathnames. A placeholder is specified within a character string by enclosing it within angle brackets. For example, in line 10 of the above example, "<PowerPoint Path>" is a placeholder. Placeholders indicate that the registration DLL should replace the placeholder with the file system pathname of the current location of the application indicated by the specified placeholder. In the example on line 10, the registration DLL will replace "<PowerPoint Path>" with the current file system pathname of the Microsoft PowerPoint application. Two "\" characters appear in line 10 after the placeholder because, in character strings, the "\" character indicates that any special effects of the character that follows are to be ignored. For example, in order to place a double quote in a character string, the double quote must be preceded by a "\" character so that the double quote does not terminate the character string, like, for example, "Here's a character string with a \" character." The two "\" characters in line 10 are parsed as a single "\" character, and the entire character string thus specifies a relative file system pathname to the file "powerpnt.exe." Because of the "Use Short Path" tag preceding line 10, the registration DLL will transform the file system pathname specifying the current location of the Microsoft PowerPoint application to an 8.3 pathname before substituting it into the character string. Once the substitution has been made, and the character string parsed by the registration DLL, the registration DLL will assign to the default key entry for the key "HKEY_CLASSES_ROOT\PowerPoint.Show.7\protocol\StdFileEditing\server" the full file system pathname to the file "powerpnt.exe." Placeholders thus provide a mechanism for specifying pathnames relative to the pathname of the current location in the file system directory structure of an application.

SKL and TOK Files

The SRG file can be split into two separate files, a SKL file and a TOK file. The SKL file is almost identical to the SRG file, except that placeholders are specified not by enclosing the placeholder name in angle brackets, but by placing the placeholder name in double square brackets. For example, line 10 of the above example SRG file might occur in a SKL file as:

@="[[PowerPointPathName]]\\powerpnt.exe"

The TOK file consists of a series of placeholder definitions. For example, the following line in a TOK file would define the placeholder specified in the above example SKL line:

[[PowerPointPathName]]=PowerPoint Path

A SKL file and the corresponding TOK file are merged together into a SRG file by providing them to a simple merge routine. The resulting SRG can then be provided to the registration and un-registration routines to register the configuration information specified in the SRG file.

The Registration DLL

The registration DLL provides a registration and an un-registration routine that can be called by both setup programs and by application programs: DllRegisterServer and DllUnregisterServer. DllRegisterServer is passed configuration information in a SRG file and registers the configuration information in the SRG in the registry. DllUnregisterServer is passed configuration information in a SRG file and removes the configuration information in the SRG file from the registry, restoring old key entries that were saved when the configuration information was registered.

Figure 2:
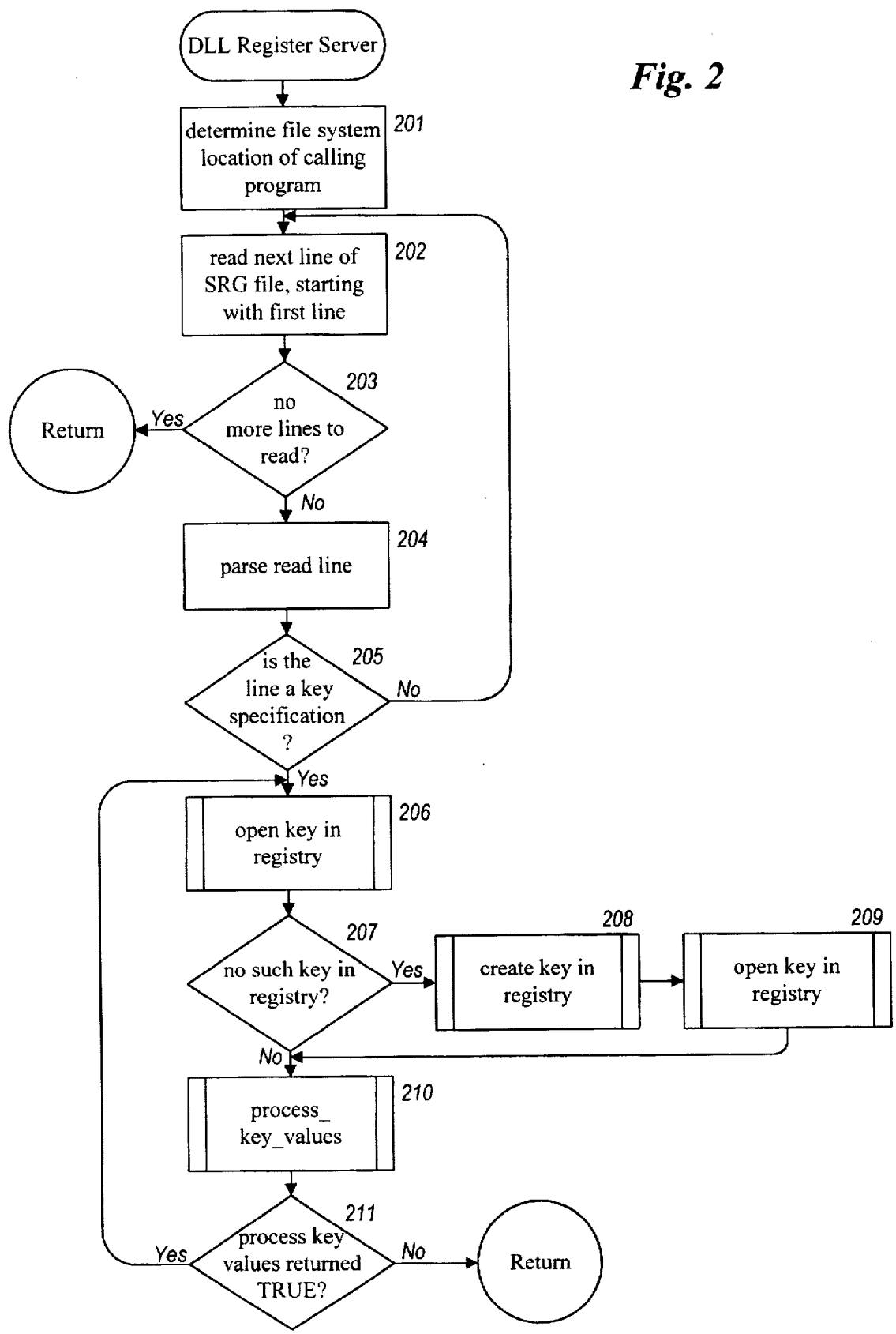
FIG. 2 displays a flow diagram for DllRegisterServer routine.

FIG. 2 shows a flow diagram for DllRegisterServer. DllRegisterServer parses a SRG file line by line and registers key entries specified in key entry assignments. If a key entry was already registered under the same name, DllRegisterServer saves the already registered key entry in a key entry named by prefixing the word "Old" to the name of the key entry specified in the key entry assignment.

In step 201, DllRegisterServer determines the file system location of the routine that called DllRegisterServer, and saves it in memory for later use. In steps 202–205, DllRegisterServer loops searching for the first line that contains a key specification. In step 202, DllRegisterServer reads the next line from the SRG file, starting with the first line. If DllRegisterServer determines in step 203 that there were no more lines to read from the SRG file, DllRegisterServer returns. Otherwise, DllRegisterServer parses, in step 204, the line read from the SRG file in step 202. If the line is not a key specification, or, in other words, the line is not the name of a key enclosed in brackets, as determined in step 205, DllRegisterServer loops to step 202 to read the next line from the SRG file. Otherwise, DllRegisterServer opens the specified key in step 206 by calling the system routine RegOpenKey. DllRegisterServer determines in step 207 from the return code returned by RegOpenKey whether the key was previously registered in the registry. If the key was not already registered, DllRegisterServer creates the key in the registry in step 208 by calling the system routine RegCreateKey and then opens the key in step 209 by calling RegOpenKey. DllRegisterServer then calls the subroutine Process_key_values to process the SRG lines following the key specification and preceding the next key specification in the SRG file. The subroutine Process_key_values returns TRUE if, after processing the lines, a subsequent key specification was read from the SRG file, and returns FALSE if no further lines remain to be read in the SRG file. If DllRegisterServer determines in step 211 that the subroutine Process_key_values has returned TRUE, then DllRegisterServer returns to step 206 to open and process the subsequent key specification. Otherwise, DllRegisterServer returns.

Figure 3:
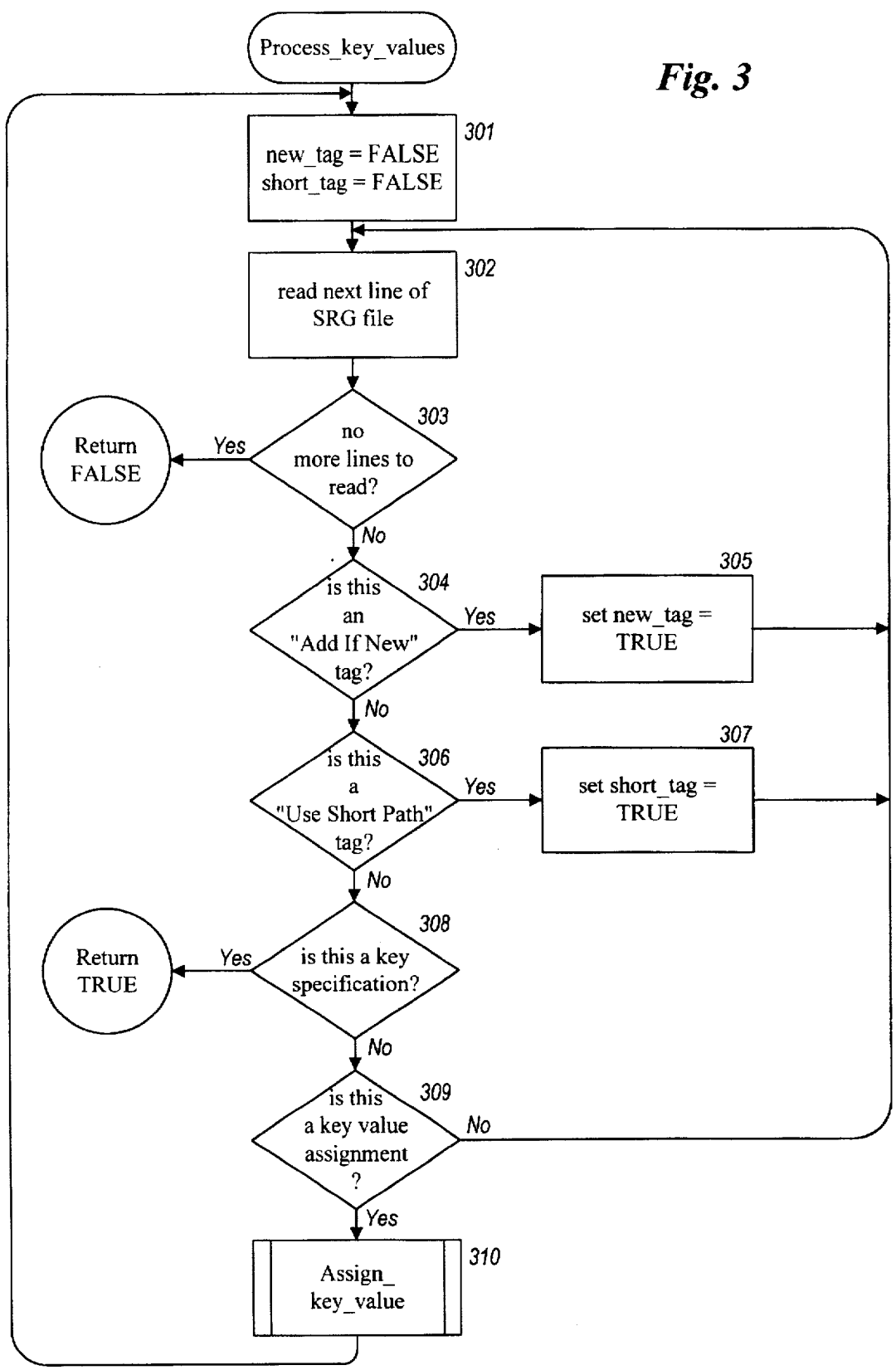
FIG. 3 displays a flow control diagram for the routine Process_key_values.

FIG. 3 shows a flow control diagram for the routine Process_key_values. This routine processes all lines in the SRG up to and including the next key specification, if any. All key entry assignments and tags associated with the key value opened in step 206 of FIG. 2 are handled by Process_key_values. In step 301, Process_key_values initializes two Boolean variables new_tag and short_tag to be FALSE. These variables indicate whether a key entry assignment has been preceded by an "Add_If_New" tag and a "Use_Short_Path" tag, respectively. In step 302, Process_key_values reads the next line from the SRG file. If Process_key_values determines, in step 303, that the SRG file contains no more lines to read, Process_key_values returns FALSE. Otherwise, Process_key_values determines, in step 304, whether the line read in step 302 is an "Add_If_New" tag, and, if so, sets the variable new_tag to TRUE in step 305 and returns to step 302 to read the next line from the SRG file. If the line read in step 302 is an "Add_If_New" tag, then, in step 306, Process_key_values determines whether the line read in step 302 is a "Use_Short_Path" tag. If a "Use_Short_Path" tag path was read in step 302, then Process_key_values sets the variable short_tag to TRUE in step 307 and returns to step 302 to read another line from the SRG file. If a "Use_Short_Path" tag was not read in step 302, then Process_key_values determines, in step 308, whether a new key specification was read in step 302. If a new key specification was read, then Process_key_values returns TRUE. Otherwise, Process_key_values determines, in step 309, whether a key entry assignment was read in step 302. If not, Process_key_values returns to step 302 to read the next line from the SRG file, but, if the line read in step 302 is a key entry assignment, then Process_key_values calls the subroutine Assign_key_value to register the key entry, and returns to step 302 to re-initialize the variables new_tag and short_tag.

Figure 4:
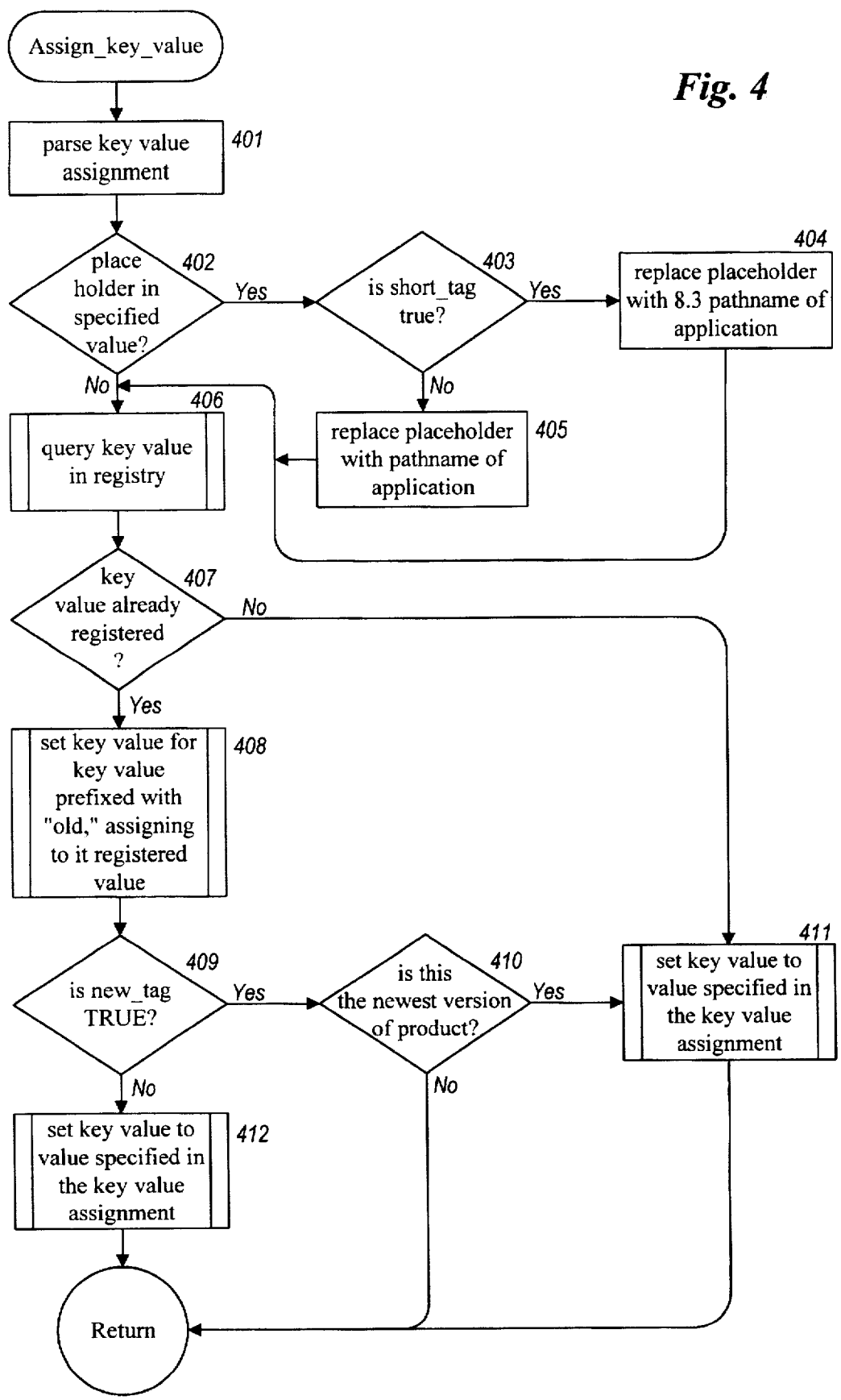
FIG. 4 displays a flow diagram of the subroutine Assign_key_value.

FIG. 4 shows a flow diagram of the routine Assign_key_value. This routine parses each key entry value assignment and registers the specified value in the registry. In step 401, Assign_key_value parses the key entry assignment that was read from the SRG file by the subroutine Process_key_values, determining the name and the specified value for the key entry. In step 402, Assign_key_value determines whether there is a placeholder in the value specified for the key entry. If a placeholder does occur in the specified value, then Assign_key_value determines in step 403 whether a "Use_Short_Path" preceded the key entry assignment. If a "Use_Short_Path" preceded the key entry assignment, the placeholder is replaces with the 8.3 form of the current pathname of the routine that called DllRegisterServer in step 404.

Otherwise, the placeholder is replaced, in step 405, with the long form of the current pathname of the routine that called DllRegisterServer. In step 406, Assign_key_value calls the system routine RegQueryValueEx to get the registered value of the key entry. If no such key entry was previously registered, as determined by Assign_key_value in step 407, Assign_key_value proceeds to step 411 where Assign_key_value calls the system routine RegSetValueEx to register the key entry with the value specified in the key entry assignment read from the SRG file. Otherwise, in step 408, Assign_key_value prefixes the word "Old" to the name of the key entry to create an old key entry name and registers the old key entry with the value determined in step 406 by calling the system routine RegSetValueEx. Assign_key_value then determines, in step 409, if an "Add_If_New" tag preceded the key entry assignment. If so, in step 410 Assign_key_value determines whether DllRegisterServer has been invoked to register key values on behalf of a more recent version of an application than the latest version number for the application stored in the registry. If a more recent version of the application has invoked DllRegisterServer, then Assign_key_value registers the key entry with the value specified in the key entry assignment read from the SRG file in step 411. If not, then Assign_key_value does not register a new value for the key entry. If Assign_key_value determines, in step 409, that no "Add_If_New" tag preceded the key entry assignment, then, in step 412, Assign_key_value calls the system routine RegSetValueEx to register the key entry with the value specified in the key entry assignment read from the SRG file.

Figure 5:
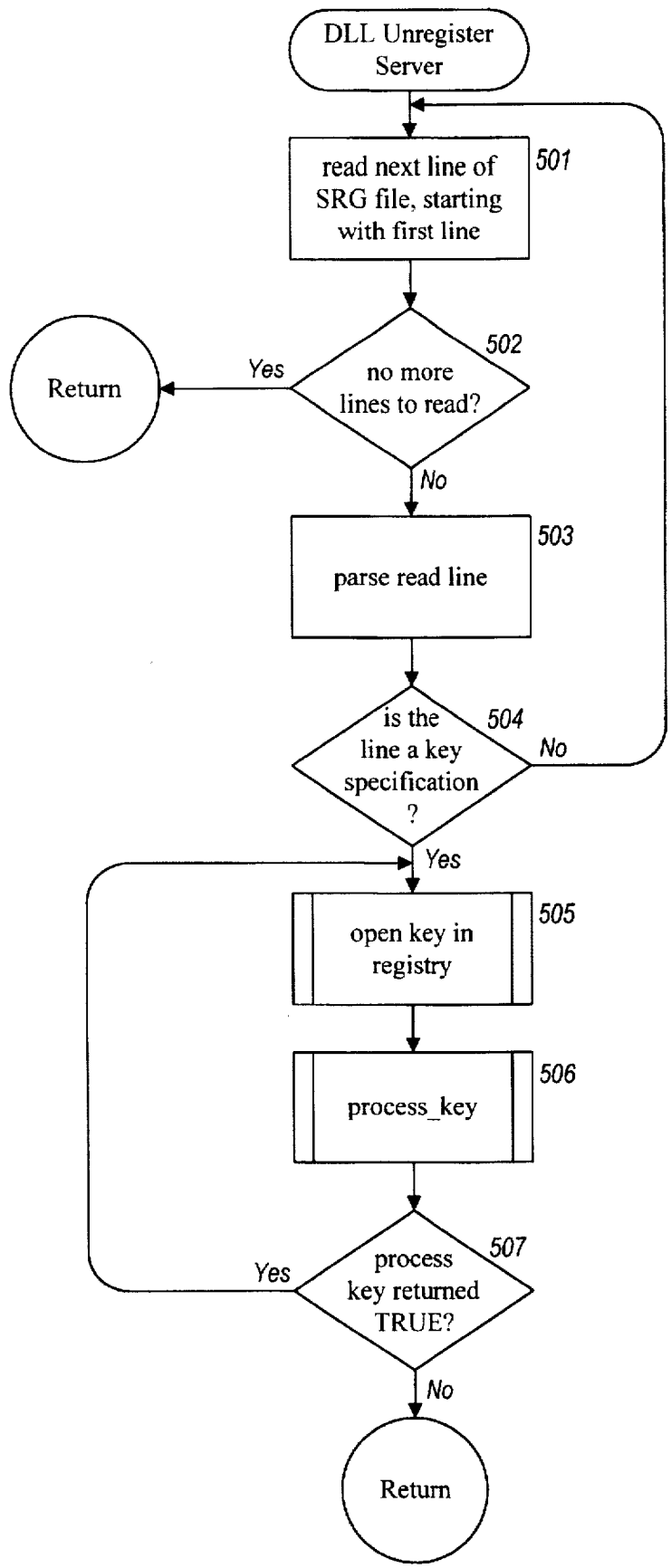
FIG. 5 displays a flow diagram for the routine DllUnregisterServer.

A flow diagram for the routine DllUnregisterServer is displayed in FIG. 5. DllUnregisterServer removes the configuration information specified in a SRG file from the registry, restoring old key entries that were saved when the configuration information was registered, and removing new keys and new key entries that were registered when the SRG was processed by a previous invocation of DllRegisterServer.

In step 501, DllUnregisterServer reads the next line from the SRG file, starting with the first line. In steps 501–504, DllUnregisterServer reads successive lines from the SRG file until it finds a key specification. If DllUnregisterServer determines in step 502 that there were no more lines to read from the SRG file, DllUnregisterServer returns. Otherwise, in steps 505–507, DllUnregisterServer opens each successive key specified in the SRG file and processes the key entry assignments for each opened key. DllUnregisterServer opens the specified key in step 505 by calling the system routine RegOpenKey. DllUnregisterServer calls the subroutine Process_key in step 506 to process the SRG lines following the key specification and preceding the next key specification in the SRG file. The subroutine Process_key returns TRUE if, after processing the lines, a subsequent key specification was read from the SRG file, and returns FALSE if no further lines remain to be read in the SRG file. If DllUnregisterServer determines in step 507 that the subroutine Process_key has returned TRUE, then DllUnregisterServer returns to step 505 to open and process the subsequent key specification. Otherwise, DllUnregisterServer returns.

Figure 6:
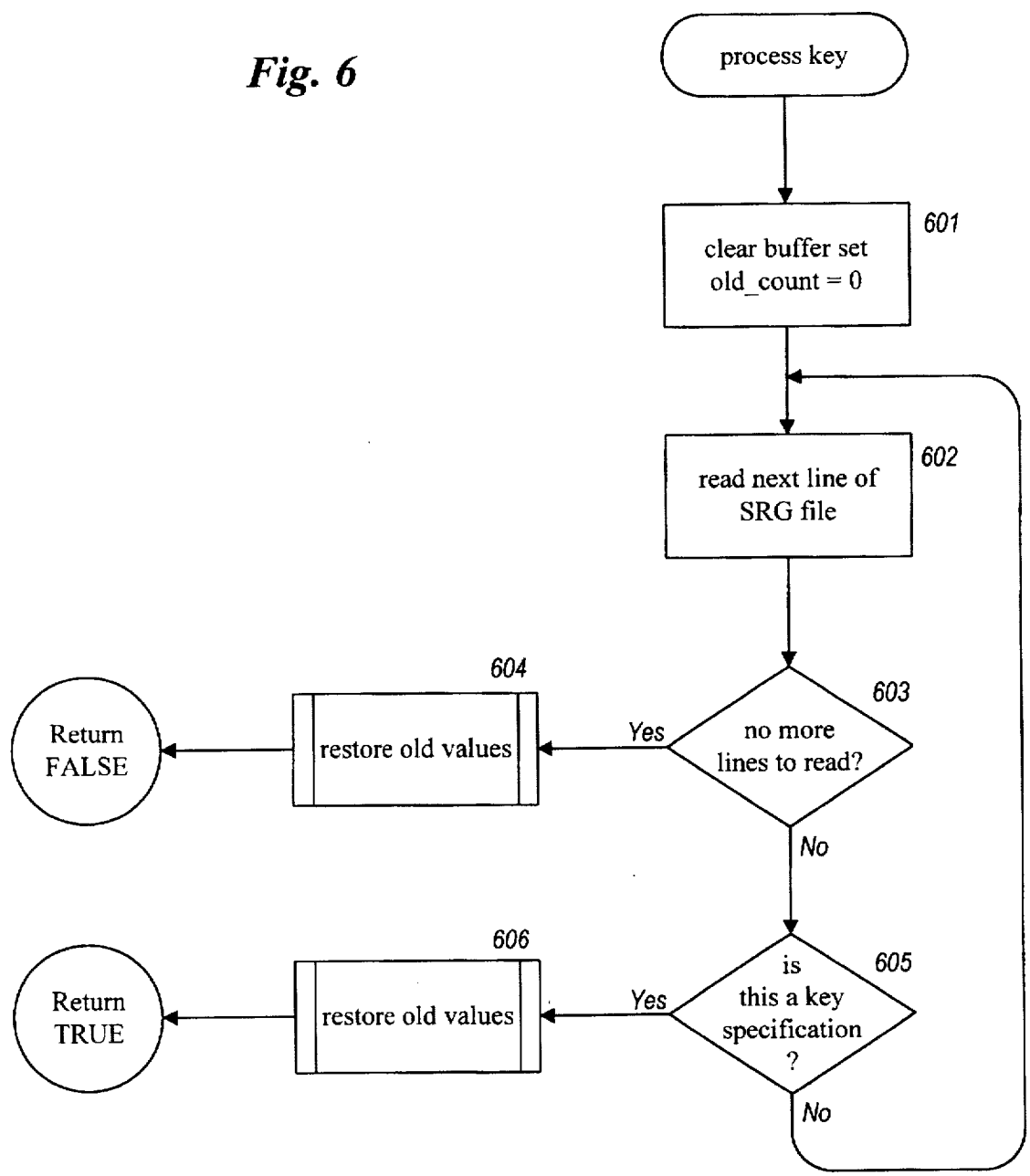
FIG. 6 displays a flow control diagram for the routine Process_key.

FIG. 6 displays a flow control diagram for the routine Process_key. This routine processes all lines in the SRG up to and including the next key specification, if any. All key entry assignments and tags associated with the key value opened in step 505 of FIG. 5 are handled by Process_key. In step 601, Process_key clears a buffer to which certain key assignment statements will be later written and initializes the variable old_count to 0. This variable indicates the number of key entry assignments saved in the buffer. In step 602, Process key reads the next line from the SRG file. If Process_key determines, in step 603, that the SRG file contains no more lines to read, Process_key calls the subroutine Restore_old_values in step 604 and then returns FALSE. Otherwise, Process_key determines, in step 605, whether a new key specification was read in step 602. If a new key specification was read, then Process_key calls the subroutine Restore_old_values in step 606 and then returns TRUE. Otherwise, Process_key returns to step 602 to read the next line from the SRG file.

Figure 7:
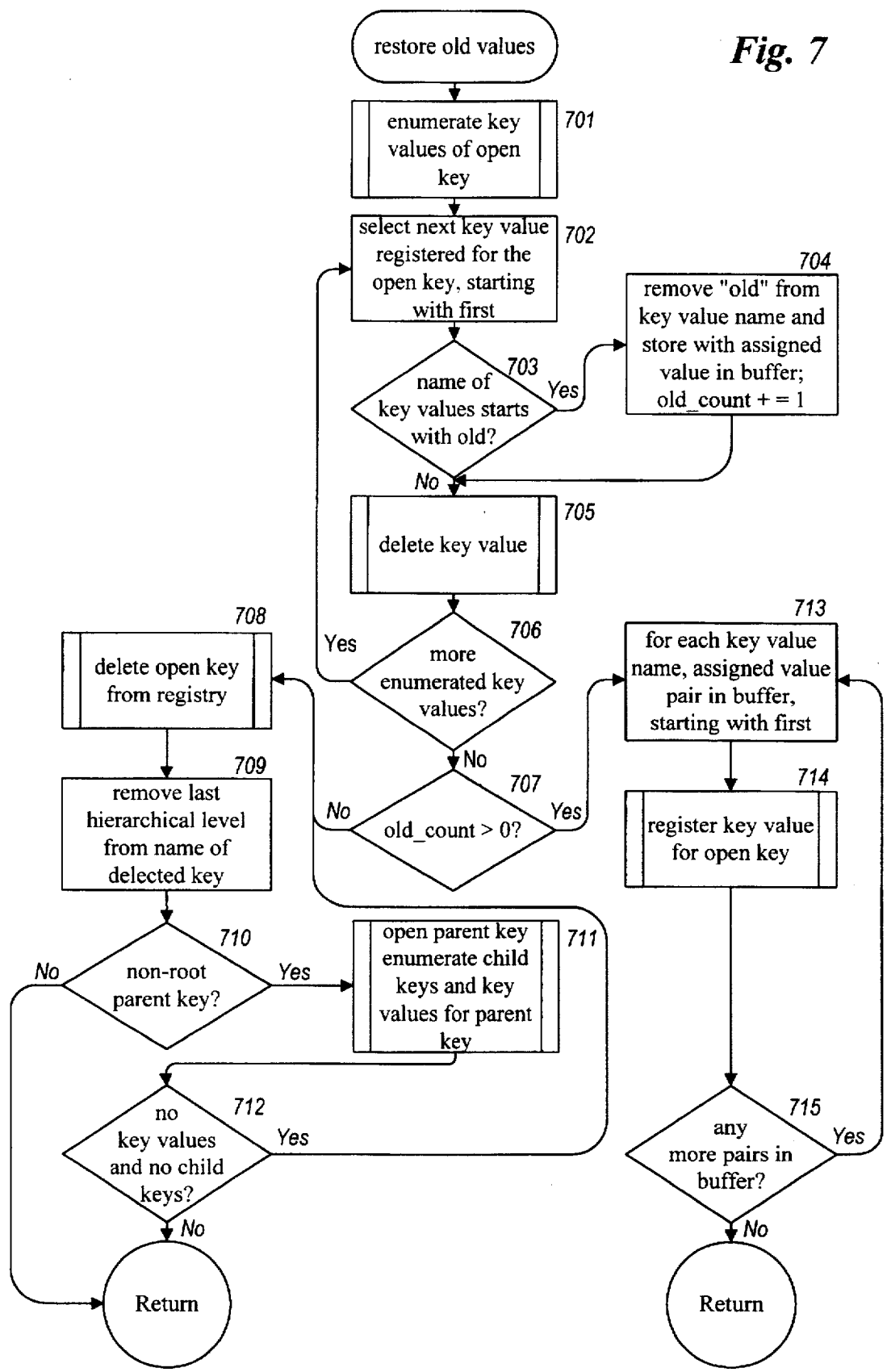
FIG. 7 shows a flow control diagram for the subroutine Restore_old_values.

FIG. 7 shows a flow control diagram for the subroutine Restore_old_values. This routine backs out all the registrations associated with the open key that were made when DllRegisterServer was previously invoked with the SRG file. Restore_old_values restores any key entry values saved with key entry names prefixed with "Old" and recursively removes empty key hierarchies resulting from un-registering the key entries specified in the SRG. In step 701, Restore_old_values calls the system routine RegEnumValue to enumerate the key entries registered for the key opened by DllUnregisterServer in step 505 in FIG. 5. Steps 702–707 represent a loop which iterates over each key entry enumerated in step 701. In step 703, Restore_old_values determines whether the name of the key entry considered in the current iteration of the loop 702–706 starts with the prefix "Old." If the name of the key entry starts with the prefix "Old," Restore_old_values removes the prefix "Old" from the key entry name and stores the name without the prefix and the value assigned to the key entry in a buffer and increments old_count. In step 705, Restore_old_values unregisters the key entry by calling the system routine RegDeleteValue. After all the key entries associated with the open key have been processed in the loop 702–706, Restore_old_values determines, in step 707, whether the variable old_count is greater than 0. If it is not, Restore_old_values deletes the open key in step 708 by calling the system routine RegDeleteKey. In step 709, Restore_old_values removes the last hierarchical level from the name of the key that was deleted in step 708. For example, if the name of the deleted key was "HKEY_LOCAL_MACHINE\SOFTWARE\Classes\Drive," the last hierarchical level "Drive" is removed in step 709 to generate the parent key "HKEY_LOCAL_MACHINE\SOFTWARE\Classes." In step 710, Restore_old_values determines whether the generated parent key is a root key. In the above example, the root key is the first hierarchical level, "HKEY_LOCAL_MACHINE." If the generated parent key is a root key, Restore_old_values returns. If the generated parent key is not a root key, then Restore_old_values opens the parent key, enumerates the key entries associated with the opened key, and enumerates the sub-keys of the parent key by calling the system routines RegOpenKey, RegEnumValue, and RegEnumKey, respectively. If the variable old_count is greater than 0, then Restore_old_values proceeds, in steps 713–715, to restore key entries that had been saved by appending the prefix "Old" to the original names of the key entries. Steps 713–715 represent a loop that iterates over each key entry name, specified value pair saved by Restore_old_values in the buffer in step 704. For each pair, Restore_old_values registers the key entry for the open key by calling the system routine RegSetValueEx. When all the saved key entry name, specified value pairs are processed by the loop 713–715, Restore_old_values returns.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

I claim:

1. A method in a computer system for registering configuration information for an application program, the computer system having a registry for storing configuration data, the application program having a setup program for storing setup configuration information in the registry during installation of the application program on the computer system, comprising:

under control of the setup program, invoking a registration routine passing an indication of a configuration file containing a description of the configuration information to be loaded into the registry for the application program;

under control of the application program, invoking the registration routine passing the indication of the configuration file; and under control of the invoked registration routine,
opening the indicated configuration file,
retrieving the description of the configuration information to be loaded, and
storing configuration information in the registry based on the retrieved description of the configuration information wherein the setup program and the application program store the configuration information in the registry in a consistent manner.

2. The method of claim 1 including:

modifying the description of the configuration information contained in the configuration wherein both the setup program and the application program store configuration information in the registry in a manner that is consistent with the modified description.

3. The method of claim 1 wherein the registry stores configuration information as key values in a hierarchical manner based on a key and wherein the configuration file contains a value for each key to be stored in the registry.

4. The method of claim 1 wherein the storing of configuration information in the registry further includes:

when the registry contains previous configuration information from a previous version of the application program, retaining the previous configuration information in the registry so that previous configuration information is available during execution of the previous version of the application program.

5. The method of claim 1 wherein the storing of configuration information in the registry further includes:

when the registry contains previous configuration information from a previous version of the application program, retaining the previous configuration information in the registry when installing a new version of the application program so that the previous configuration information can be stored as the current configuration information when the new version of the application program is un-installed.

6. The method of claim 1 wherein the description of the configuration information contains a placeholder for storing an indication of a file system directory in which executable code of the application program is stored and including:

under control of the invoked registration routine,
determining the directory in which the application program is stored; and
replacing the placeholder with an indication of the determined directory so that the stored configuration information reflects the directory in which contains the executable code of the application program.

7. The method of claim 1 wherein the description of the configuration information contains a placeholder and including:

under control of the invoked registration routine,
determining information to replace the placeholder; and
replacing the placeholder with the determined information so that the configuration information can be dynamically modified during execution of the programs.

8. The method of claim 1 including:
under control of the application program,
retrieving stored configuration information from the registry, and
performing a behavior based on the retrieved configuration information.

9. The method of claim 1 wherein the registration routine is application program independent.

10. The method of claim 1 wherein the registration routine is invoked by multiple application programs.

11. The method of claim 1 wherein the configuration file is specified in an application-independent format.

12. The method of claim 1 wherein the configuration file contains a flag indicating that the configuration information should only be stored if the application program is a new version of the application program.

13. The method of claim 1 wherein the configuration file contains a flag indicating that a file system pathname should be changed to a different format.

14. The method of claim 13 wherein the different format is an 8.3 format.

15. A computer system for registering configuration information, comprising:
a registry for storing keys and associated values;
a configuration file containing a description of configuration information to be stored in the registry;
a registration routine for retrieving the description from the configuration file and for storing the described configuration information in the registry;
a setup program for invoking the registration routine to store in the registry configuration information described in the configuration file; and
an application program for invoking the registration routine to store in the registry configuration information described in the configuration file and for retrieving configuration information from the registry and performing a behavior based on the retrieved configuration information
wherein the setup program and the application program register configuration information in a consistent manner.

16. The computer system of claim 15 wherein the registry stores the keys are hierarchically organized.

17. The computer system of claim 15 wherein the registration routine determines whether the registry contains previous configuration information from a previous version of the application program and when the registry contains such information, retains the previous configuration information in the registry so that previous configuration information is available during execution of the previous version of the application program.

18. The computer system of claim 15 wherein the registration routine determines whether the registry contains previous configuration information from a previous version of the application program and when the registry contains such information, retains the previous configuration information in the registry when installing a new version of the application program so that the previous configuration information can be stored as the current configuration information when the new version of the application program is un-installed.

19. The computer system of claim 15 wherein the description of the configuration information contains a placeholder and wherein the registration routine determines information to replace the placeholder and replaces the placeholder with the determined information so that the configuration information can be dynamically modified during execution of the programs.

20. A method in a computer system for registering and un-registering configuration information of an application program, the computer system having a registry for storing configuration information for the application program, the application program having a new version and an old version, configuration information for the old version of the application program being registered in the registry, comprising:
when registering configuration information for the new version of the application program,
saving configuration information for the old version of the application program; and
storing the configuration information for the new version of the application program in the registry; and
when un-registering configuration information for the new version of the application program,
removing configuration information for the new version of the application program from the registry; and
storing the saved configuration information for the old version of the application program in the registry so that after un-registering the configuration information for the new version of the application program, the old version of the application program can retrieve its configuration information from the registry.

21. The method of claim 20 wherein the configuration data for the old version of the application program is saved in the registry.

22. The method of claim 20 wherein the registry stores configuration information a currently registered version of the application program as a key entry having a key entry name and a key entry value and wherein the configuration information for the old version of the computer program is stored in a key entry with a key entry name that is a variation of the key entry name for the currently registered version of the application program.

23. The method of claim 22 wherein the variation of the key entry name is created by adding a prefix.

24. A method in a computer system for customizing configuration information for an application program to be registered in a registry, comprising:
creating a configuration skeletal file containing configuration information with placeholders indicating where customized configuration information is to be inserted;
creating a configuration token file containing tokens corresponding to customized configuration information replace the placeholders of the configuration skeletal file;
creating a customized configuration file by replacing the placeholders of the configuration skeletal file with the tokens of the configuration token file;
opening the customized configuration file;
retrieving the configuration information from the opened configuration file; and
storing the configuration information in the registry.

25. The method of claim 24 wherein the configuration token file contains configuration information localized to a country in which the application program will be executed.

26. The method of claim 24 wherein the opening, retrieving, and storing are performed by a registration routine.

27. The method of claim 26 wherein the registration routine is invoked by the application program.

28. The method of claim 26 wherein the registration routine is invoked by a setup program for the application program.

29. The method of claim 26 wherein the registration routine is invoked by both the application program and a setup program for the application program.

30. A method in a computer system for registering components of an application program after installation of the application program, the computer system having a registry for containing configuration information, the application program having a configuration file containing configuration information for the application program, comprising:

modifying the configuration file to contain configuration information describing the component to be installed; and under control of the application program,
opening the modified configuration file,
retrieving from the opened configuration file configuration information describing the component; and
storing the retrieved configuration information in the registry
so that the component can be automatically installed when the application program is executed.

31. A computer-readable medium containing instruction for causing a computer system to register configuration information for an application program, the computer system having a registry for storing configuration data, the application program having a setup program for storing setup configuration information in the registry during installation of the application program on the computer system, by:

under control of the setup program, invoking a registration routine passing an indication of a configuration file containing a description of the configuration information to be loaded into the registry for the application program, the registration routine being invocable by a plurality of computer programs;

under control of the application program, invoking the registration routine passing the indication of the configuration file; and under control of the invoked registration routine,
opening the indicated configuration file,
retrieving the description of the configuration information to be loaded, and
storing configuration information in the registry based on the retrieved description of the configuration information.

32. The computer-readable medium of claim 31 including:

modifying the description of the configuration information contained in the configuration wherein both the setup program and the application program store configuration information in the registry in a manner that is consistent with the modified description.

33. The computer-readable medium of claim 31 wherein the registry stores configuration information as key values in a hierarchical manner based on a key and wherein the configuration file contains a value for each key to be stored in the registry.

34. The computer-readable medium of claim 31 wherein the storing of configuration information in the registry further includes:

when the registry contains previous configuration information from a previous version of the application program, retaining the previous configuration information in the registry so that previous configuration information is available during execution of the previous version of the application program.

35. The computer-readable medium of claim 31 wherein the storing of configuration information in the registry further includes:

when the registry contains previous configuration information from a previous version of the application program, retaining the previous configuration information in the registry when installing a new version of the application program so that the previous configuration information can be stored as the current configuration information when the new version of the application program is un-installed.

36. The computer-readable medium of claim 31 wherein the description of the configuration information contains a placeholder for storing an indication of a file system directory in which executable code of the application program is stored and including:

under control of the invoked registration routine,
determining the directory in which the application program is stored; and
replacing the placeholder with an indication of the determined directory so that the stored configuration information reflects the directory in which contains the executable code of the application program.

37. A computer-readable medium containing instructions for causing a computer system to register and un-register configuration information of an application program, the computer system having a registry for storing configuration information for the application program, the application program having a new version and an old version, configuration information for the old version of the application program being registered in the registry, by:

when registering configuration information for the new version of the application program,
saving configuration information for the old version of the application program; and
storing the configuration information for the new version of the application program in the registry; and when un-registering configuration information for the new version of the application program,
removing configuration information for the new version of the application program from the registry; and
storing the saved configuration information for the old version of the application program in the registry so that after un-registering the configuration information for the new version of the application program, the old version of the application program can retrieve its configuration information from the registry.

38. The computer-readable medium of claim 37 wherein the configuration data for the old version of the application program is saved in the registry.

39. The computer-readable medium of claim 37 wherein the registry stores configuration information a currently registered version of the application program as a key entry having a key entry name and a key entry value and wherein the configuration information for the old version of the computer program is stored in a key entry with a key entry name that is a variation of the key entry name for the currently registered version of the application program.

40. The computer-readable medium of claim 39 wherein the variation of the key entry name is created by adding a prefix.

* * * * *